United States Patent [19]

Kitamura

[11] 4,393,387

[45] Jul. 12, 1983

[54] BEAM RECORDING APPARATUS EFFECTING THE RECORDING BY A PLURALITY OF BEAMS

[75] Inventor: Takashi Kitamura, Yokohama, Japan

[73] Assignee: Canon Kabushiki Kaisha, Tokyo, Japan

[21] Appl. No.: 184,146

[22] Filed: Sep. 4, 1980

[30] Foreign Application Priority Data

| Sep. 14, 1979 | [JP] | Japan | 54-118246 |
| Jan. 10, 1980 | [JP] | Japan | 55-1571 |
| Jan. 24, 1980 | [JP] | Japan | 55-7224 |
| Jan. 24, 1980 | [JP] | Japan | 55-7231 |
| Jun. 19, 1980 | [JP] | Japan | 55-83064 |
| Jun. 24, 1980 | [JP] | Japan | 55-85574 |

[51] Int. Cl.³ .............................................. G01D 15/4
[52] U.S. Cl. ................................................. 346/108
[58] Field of Search .............. 346/76 L, 108; 358/296, 358/298, 299, 302, 283, 285, 293

[56] References Cited

U.S. PATENT DOCUMENTS

| 4,059,833 | 11/1977 | Kitamura | 346/108 |
| 4,110,796 | 8/1978 | Aughton | 358/298 |
| 4,253,102 | 2/1981 | Kataoka et al. | 346/108 |

Primary Examiner—G. Z. Rubinson
Assistant Examiner—W. J. Brady
Attorney, Agent, or Firm—Fitzpatrick, Cella, Harper & Scinto

[57] ABSTRACT

A beam recording apparatus effecting the recording by a plurality of beams comprises a beam generator for generating a plurality of beams modulated with recording signals, a beam deflector for deflecting the beams generated by the beam generator, a beam irradiated member irradiated with the plurality of beams deflected by the beam deflector, and a device for varying the inclination of the plurality of beams with respect to the beam irradiated member.

6 Claims, 25 Drawing Figures

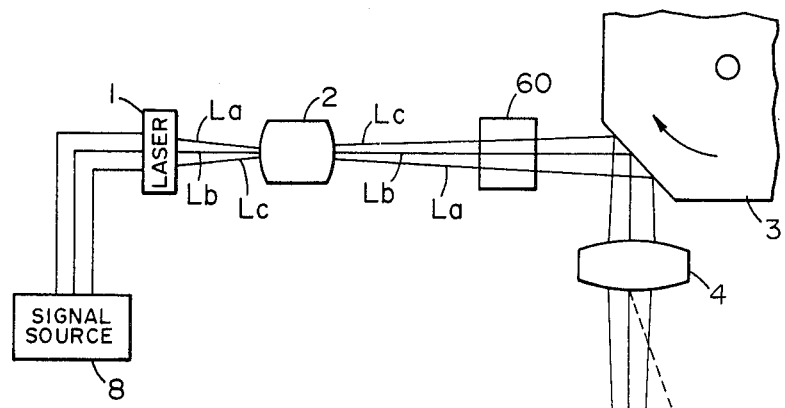
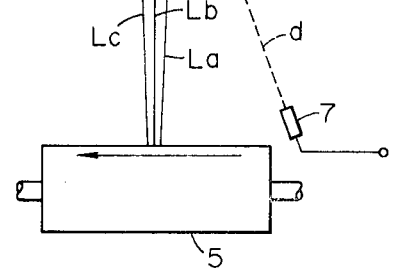
FIG. 1
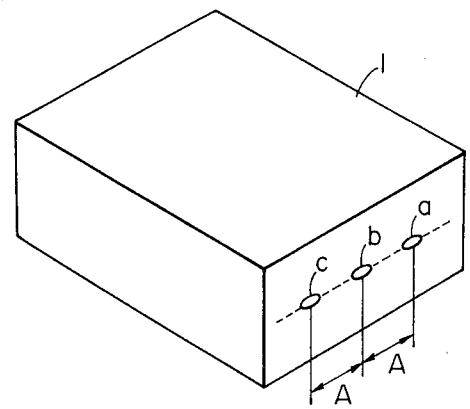
FIG. 2

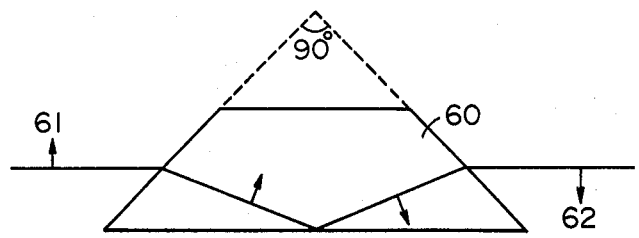
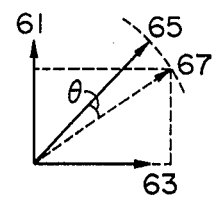
FIG. 6A
FIG. 6C
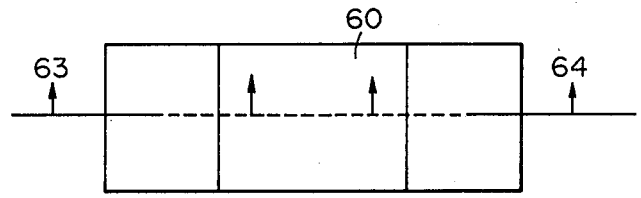
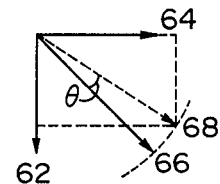
FIG. 6B
FIG. 6D
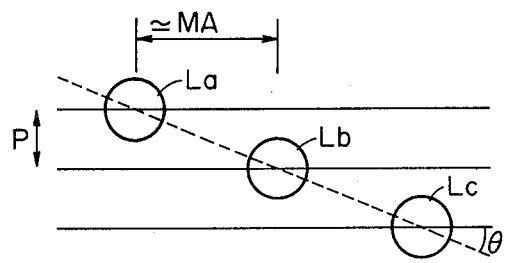
FIG. 7A
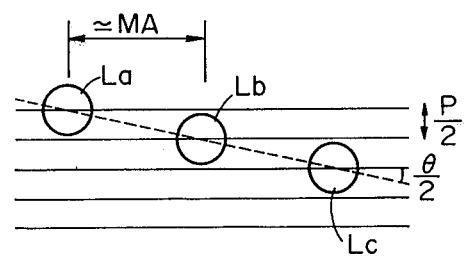
FIG. 7B

BEAM RECORDING APPARATUS EFFECTING THE RECORDING BY A PLURALITY OF BEAMS

BACKGROUND OF THE INVENTION

1. Field of the Invention

This invention relates to a beam recording apparatus effecting the recording by a plurality of beams in which a plurality of beams modulated with modulation signals are projected upon a recording medium to thereby record information on the recording medium.

2. Description of the Prior Art

In the conventional recording apparatus for recording information on a recording medium, the recording medium is scanned with a single beam to effect the recording and therefore, when printing is to be effected at high speed, it is necessary to increase the transfer speed of information signals for modulating the beam.

It is also necessary to speed up the main scanning and therefore, when a rotatable polygonal mirror is used for the main scanning, the number of revolutions thereof must sometimes be as great as several tens of thousands of rpm (revolutions per minute) and necessarily, there is a structural limit in making the apparatus into a high speed recording apparatus.

If the light beams from a plurality of light sources arranged in a row are deflected by a rotatable polygonal mirror to scan a recording medium, it will be possible to obtain a high speed recording apparatus, but if the beams are arranged in a direction perpendicular to the auxiliary scanning direction of the recording medium, there is a disadvantage that the interval between adjacent beams cannot be narrowed to less than a predetermined distance.

To eliminate such a disadvantage, I proposed in Japanese Patent Laid-open Publication No. 38130/1979 a scanning device in which the recording medium is irradiated with a plurality of beams so that the beams are not perpendicular to the auxiliary scanning direction of the recording medium.

However, if the recording medium is scanned with the beams being so inclined, the times during which the respective beams cross the recording medium differ and this leads to complicated control of the recording and difficulty with which the recording is effected at an accurate position.

Also, if information recording is effected by the beams so inclined to in the scanning direction, the scanning pitch in the auxiliary scanning direction of the recording medium by the beams is determined by the arrangement of the plural beams and is thus invariable even if the main scanning speed and the auxiliary scanning speed are varied. Therefore, where a single beam is used, the auxiliary scanning density can be doubled by doubling the main scanning speed, for example, and the recording of high density and high quality can be accomplished by the same apparatus, but where a plurality of beams are used, this cannot be accomplished unless a complicated interlace system is adopted, and it is difficult to effect the recording of high density and high quality by the same apparatus with the scanning pitch in the auxiliary scanning direction being variable.

SUMMARY OF THE INVENTION

It is therefore an object of the present invention to provide a beam recording apparatus using a plurality of beams and capable of effecting the recording of information accurately by a very simple construction.

It is a further object of the present invention to eliminate various disadvantages occurring when a recording medium is scanned with a plurality of beams inclined relative to the scanning direction so that the arrangement direction of the beams and the scanning direction of the beams are not perpendicular to each other.

It is still a further object of the present invention to provide a beam recording apparatus capable of effecting the recording accurately in accordance with the deviation between a plurality of beams.

It is yet still a further object of the present invention to provide a beam recording apparatus capable of producing accurate synchronous signals corresponding to a plurality of beams.

It is another object of the present invention to provide a beam recording apparatus in which the recording density can be readily varied by using a plurality of beams.

BRIEF DESCRIPTION OF THE DRAWINGS

The invention will become fully apparent from the following detailed description thereof taken in conjunction with the accompanying drawings, in which:

FIG. 1 illustrates a beam recording apparatus effecting the recording by a plurality of beams to which the present invention is applied;

FIG. 2 is a perspective view of a semiconductor array laser light source;

FIGS. 6A-6D are illustrations of an image rotator;

FIGS. 7A and 7B are front views of the beams on the recording medium;

DESCRIPTION OF THE PREFERRED EMBODIMENTS

Figure 3:
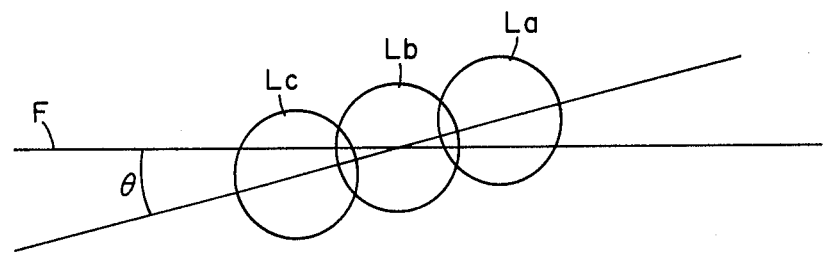
FIG. 3 is a front view of a plurality of beams.

The invention will hereinafter be described with respect to an embodiments thereof and with reference to the drawings. In the apparatus shown in FIGS. 1 and 2, reference numeral 1 designates a semiconductor array laser light source having a plurality of light emitting points a, b and c arranged in a row at an interval A. The emissions of beam from the light emitting points a, b and c can be discretely controlled by the image signal from an image signal source 8.

Such a beam is condensed by a condensing optical system 2 and enters an image rotator 60. The beam passed through the image rotator has its beam arrangement rotated and is projected upon a rotatable polygonal mirror 3, and the beam reflected by the rotatable polygonal mirror 3 is imaged on a photosensitive drum 5 by an imaging optical system 4.

The image rotator will be described in detail. When the light beams represented by segments of line 61 and 63 are incident on the image rotator 60 shown in FIGS. 6A and 6B (FIG. 6A is a side view and FIG. 6B is a top plan view), the beams are first refracted and further totally reflected by the base plane of the image rotator 15 and further refracted to provide beams represented by segments of line 62 and 64. When totally reflected, the beams are reversed relative to the direction 61 and directed in the opposite direction to the direction 62. Therefore, the segment in the direction 65 shown in FIG. 6C, after having passed through the image rotator 60, is rotated through 90° into the direction 66. Relative to the direction 67 offset by $\theta$ with respect to the direction 65, the segment is changed into the direction 68 after having passed through the image rotator.

Thus, if the light emitting points a, b and c of the semiconductor array laser are arranged in the direction 65, the beam after having passed through the image rotator is rotated through 90° into the direction 66. If the direction 66 is set to the scanning direction of the rotatable polygonal mirror, the semiconductor array laser will become arranged perpendicularly to the scanning surface. If the image rotator is rotated through an angle of $\theta$, the semiconductor array laser is relatively rotated in the direction 67 and therefore, the beam arrangement after passed through the rotator is rotated in the direction 68 and becomes such as shown in FIG. 3.

The light source 1 is disposed near the focus of the condensing optical system 2 so that the beams a, b and c have an angle $\theta$ ($\theta = \sin^{-1} P/MA$ where M is the magnifiction of the entire condensing optical system and imaging optical system) as shown in FIG. 3 which corresponds to a variable pitch P with respect to the rotating surface F of the rotatable polygonal mirror 3, by the image rotator 9 being rotated. Then, the individual light emitting point areas of the semiconductor array laser light source 1 can be regarded as spot light sources because they are as small as 10 and several $\mu m$ or less, and there can be provided a plurality of laser lights collimated by the condensing optical system 2.

If, for example, $P \approx 100$ $\mu m$ and $M \approx 10$ and $A \approx 100$ Mm, the angle $\theta$ is very small and if $P \approx 50$ Mm, the angle $\theta$ is further smaller and therefore, the cross-section of the laser light incident on the rotatable polygonal mirror 3 does not become so great in the direction perpendicular to the rotating surface F of the rotatable polygonal mirror 3 and does not so much differ from the case of a single beam. Accordingly, it is not necessary to increase the thickness of the rotatable polygonal mirror 3 and use can be made of the same rotatable polygonal mirror as that used for a single beam.

Figure 4:
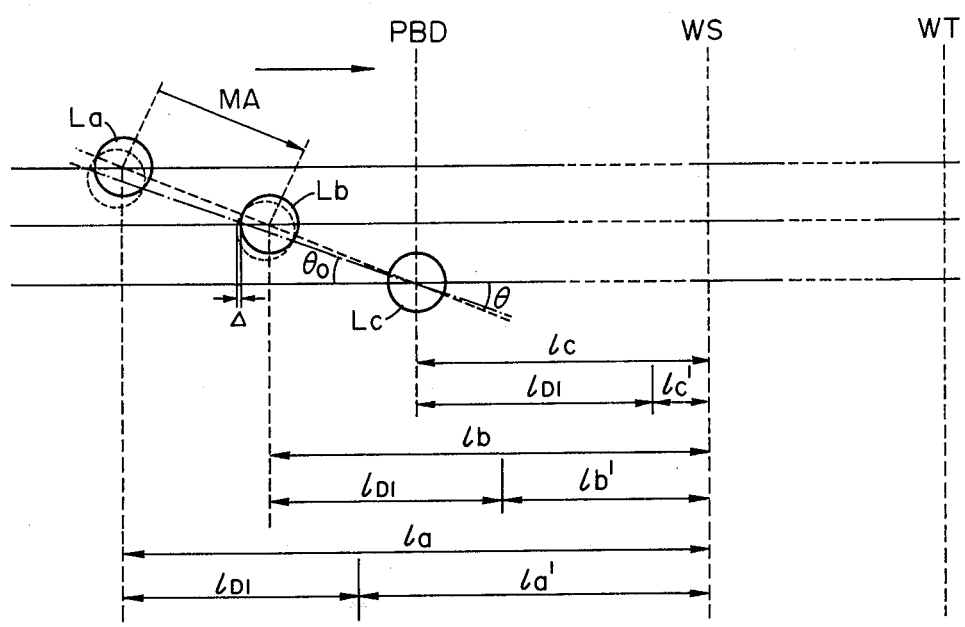
FIG. 4 is a front view of the beams on a recording medium.

The plurality of laser lights reflected by the rotatable polygonal mirror 3 are imaged and scanned on the photosensitive drum 5 by the imaging lens 4, as shown in FIG. 4. The interval between the light emitting points is A and therefore, if the magnification of the entire opticl system is M, the interval between the imaged spots is MA. Also, the angle of the array of the imaged spots of the array laser with respect to the scanning surface is $\theta$ and therefore, the interval between the imaged spots in the direction perpendicular to the scanning is MA sin $\theta = P$.

At the beginning of the scanning, such plurality of beams Lc, Lb and La cross a photodetector 7 in the named order.

As described above, the scanning pitch is given by $P = MA \sin \theta$ and therefore, the scanning pitch is not varied even if the speed of the main scanning and of the auxiliary scanning is varied. This has led to the difficulty with which high density recording of high quality is effected by doubling the scanning density for the same apparatus.

The present invention makes the angle $\theta$ variable by using a beam rotating member such as an image rotator or the like and makes the scanning pitch P variable to thereby eliminate the above-noted disadvantage and thereby vary the density for the same apparatus so as to enable high density recording to be accomplished.

Figure 5:
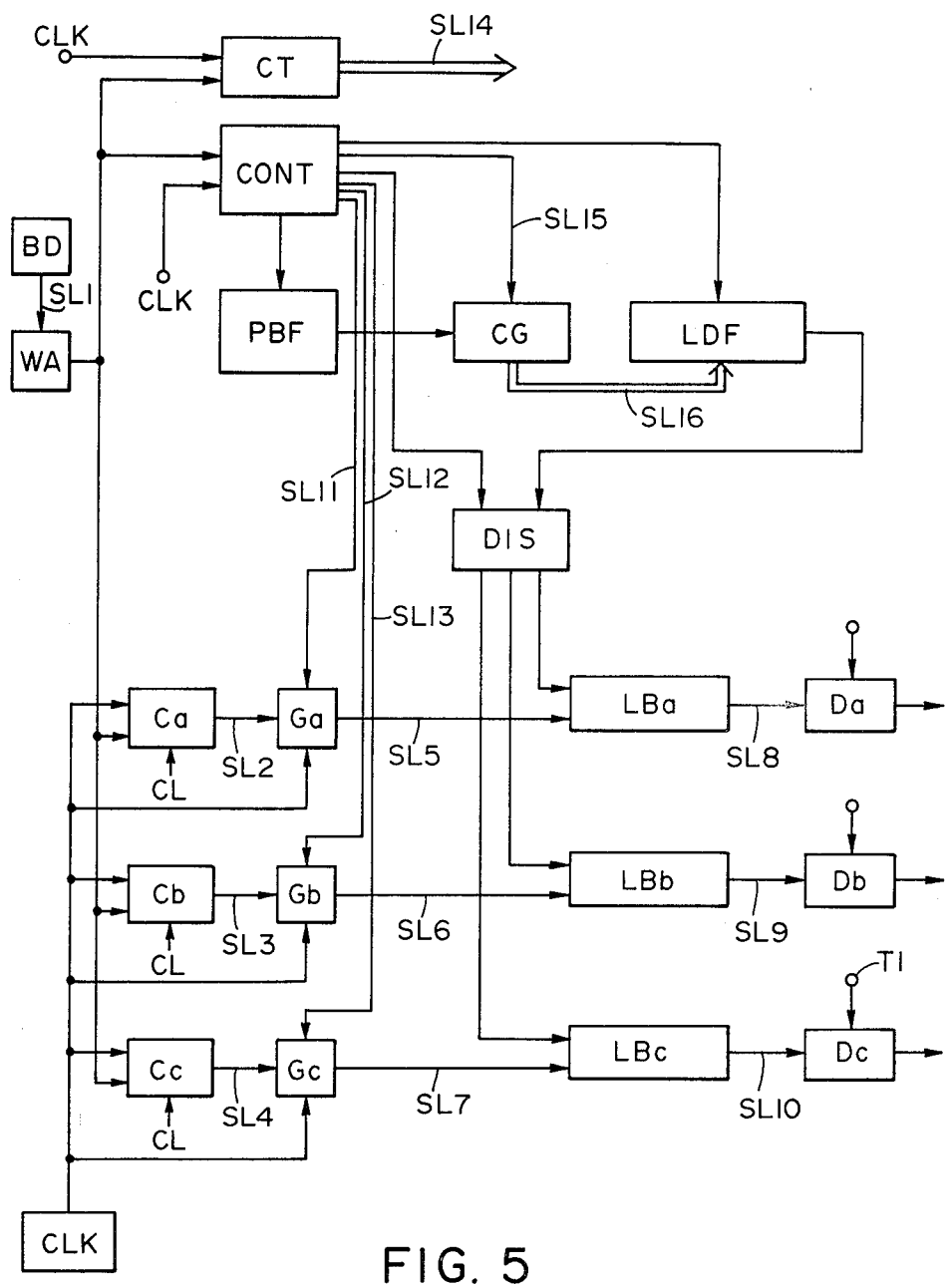
FIG. 5 is a schematic block diagram of the control circuit of the beam recording apparatus.

The image signal source 8 in FIG. 1 will further be described. Designated by BD in FIG. 5 is a beam detector. In this embodiment, as will be described later, the beam crosses the beam detector BD with only the beam Lc turned on and therefore, only one beam detection signal is led out on a signal line SL 1 and this beam detection signal is shaped into a short waveform pulse-like signal by a waveform shaping circuit WA.

Designated by Ca, Cb and Cc are counters. Ca is a counter for counting a number of clocks Na equal to the time period from after the beam Lc has been detected by the beam detector BD until the beam La actually turned off reaches the recording start position WS on the photosensitive drum, Cb is a counter for counting a number of clocks Nb equal to the time period from after the beam Lc has been detected by the detector BD until the beam Lb actually turned off reaches recording start position WS, and Cc is a counter for counting a number of clocks Nc equal to the time period from after the beam Lc has passed a position corresponding to the beam detector BD until it reaches recording start position WS.

Such counters Ca, Cb and Cc start counting with the beam detection signal being applied and when they have counted the predetermined numbers Na, Nb and Nc, respectively, they derive a control signal on signal lines SL 2, SL 3 and SL 4 and control clock appliers Ga, Gb and Gc each comprising a gate circuit to thereby derive on signal lines SL 5, SL 6 and SL 7 a clock signal generated by a clock generator CLK.

Designated by LBa, LBb and LBc are line buffer memories having stored therein a dot signal M corresponding to one scanning line, and by the clock signal being applied thereto from the signal line SL 5, SL 6 and SL 7, the dot signal is derived on signal lines SL 8, SL 9 and SL 10 in synchronism with the applied clock signal.

The dot signal thus derived controls the emissions of light beams from the light-emitting points a, b and c of the semiconductor array laser light source 1 through driving circuits Da, Db and Dc. Designated by CT is a counter for controlling the turn-on of the light beams so that a light beam passes through the beam detector BD with only the light beam Lc turned on and the other light beams La and Lb turned off. The counter CT derives a turn-on signal on a signal line SL 14 after it has counted a sufficient numerical value P for all the beams La, Lb and Lc to completely irradiate the photosensitive drum 5, and forces the light beam Lc to be emitted by applying such turn-on signal to the terminal T₁ of the driving circuit DC.

This counter CT is adapted to be cleared in response to the beam detection signal and therefore, once the beam detector BD detects the beam Lc, the emission of the beam Lc is suppressed. Designated by PBF is a page buffer memory having stored therein information involved in at least one page. From this memory, character code signals belonging to a certain column are successively derived under the control of a control circuit CONT and applied to a character generator CG having stored therein a character a dot pattern corresponding to this character code while, at the same time, what line of this character dot pattern should be produced is instructed by a signal line SL 15 signal, whereby a dot signal belonging to the selected line of the selected character dot pattern is derived on a signal line SL 16 and stored in a line data forming device LDF. After the dot signals corresponding to one line have thus been stored in the line data forming device LDF, such line dot signals corresponding to one line are stored in a line buffer LBa, LBb or LBc under the control of a distributor DIS.

The operation of the beam recording apparatus having the above-described construction will further be described. When the light beam scanned by the arrangement as shown in FIG. 4 enters the beam detector BD with only the light beam Lc turned on (it is to be understood that PBD indicates the location whereat the beam detector is installed), the counter CT is cleared and the counters Ca, Cb and Cc start counting the clocks. When the counter Cc has counted the clock number Nc corresponding to the distance lc in FIG. 4 and the imaginary beam Lc has reached the recording start position WS, output of the clock onto the signal line SL₇ is initiated under the control of the output of the counter Cc of the clock applier Gc. Dot signals corresponding to one line are already stored in the line buffers LBa, LBb and LBc and therefore, the dot signals are output onto the signal line SL₁₀ upon application of the clock signal and the semiconductor laser is driven through the driving circuit DC, whereby the light beam Lc modulated in response to the dot signals begins to be emitted. Likewise, when the counter Cb counts the number Nb corresponding to the distance lb, read-out of the dot signals stored in the line buffer LBb is started and the light beam Lb modulated by these dot signals begins to be emitted. Likewise, when the counter Ca counts the number Na corresponding to the distance la, read-out of the dot signals stored in the line buffer LBa is started and the light beam La modulated by these dot signals begins to be emitted. However, Na>Nb>Nc.

Scanning of the photosensitive drum 5 is effected with the three beams La, Lb and Lc being thus modulated by the dot signals from the three line buffers LBa, LBb and LBc, and the point of time whereat the read-out of the dot signals from the line buffer LBc has been completed is the point of time whereat the beam Lc has reached the recording stop position WT, and the points of time whereat the read-out of the dot signals from the line buffers LBb and LBa has been completed are the points of time whereat the beams Lb and La have respectively reached said position WT.

Even if a clock is further applied after the read-out of the dot signals from the line buffer LB has been completed, the dot signals are no longer output and therefore, the light beams La, Lb and Lc are not emitted.

Accordingly, the emissions of the beams La, Lb and Lc modulated by the dot signals take place only between the recording start position WS and the recording stop position WT. When the counter CT has counted the numerical value P and the light beams La, Lb and Lc have escaped from the photosensitive drum 5, a control signal is applied to a terminal T₁ to turn on the light beam Lc alone while, at the same time, clock appliers Ga, Gb and Gc are controlled by the control circuit CONT to stop the application of clocks to the line buffers LBa, LBb and LBc. By the time when the light beam Lc is detected by the beam detector BD, new dot signals to be recorded next time are stored in the line buffers LBa, LBb and LBc.

Description will now be made of a case where the angle $\theta$ is varied.

In FIGS. 7A and 7B, P designates a pitch and it has been confirmed that even if this pitch deviates by the order of $\frac{1}{8}$ P, the formed image is practically unobjectionable. It has also been confirmed that even if the deviation of the dots in the scanning direction is up to the order of $\frac{1}{8}$ of the dot interval (substantially equal to said P), it offers no problem but is fit for practical use.

Accordingly, even if the angle of inclination $\theta$ of the array becomes $\theta_o$ by mistake as shown in FIG. 4 due to a mounting error or the like and a deviation corresponding to $\frac{1}{8}$ P occurs in the direction perpendicular to the scanning direction, if the beam array is set to the angle $\theta$ or less whereat the error $\Delta$ occurring in the horizontal direction is below $\frac{1}{8}$ of the dot interval, it is not necessary to change the count numbers Na, Nb and Nc corresponding to the beams a, b and c in the main scanning direction and it is possible to effect the data output by the use of the same circuit construction.

The angle $\theta$ can be obtained as follows:

Since $\Delta = Ml |\cos \theta - \cos \theta_o| \leq (P/8)$ ($\Delta$ is the deviation in the main scanning direction, l is the array interval, and M is the magnification of the scanning optical system, $$\sqrt{1 - \left(\frac{P}{Ml}\right)^2} - \frac{1}{8} \frac{P}{Ml} \leq$$

$$\sqrt{1 - \left(\frac{Po}{Ml}\right)^2} \text{ when } Po \geq P,$$

$$\sqrt{1 - \left(\frac{Po}{Ml}\right)^2} \leq$$

$$\sqrt{1 - \left(\frac{P}{Ml}\right)^2} + \frac{1}{8} \frac{P}{Ml} \text{ when } Po \leq P.$$

From this, it is seen that $\theta \leq 48.8°$. In other words, if $\theta \leq 48.8°$, even if the semiconductor chip was mounted on the recording surface with a deviation of $\frac{1}{8}$ P in the main scanning direction, the deviation in the horizontal direction could also be kept within $\frac{1}{8}$ of the dot interval (P).

When the recording density is changed to two times or four times, the inclination $\theta$ of the beam is changed as will later be described, but from the foregoing formulas, it is seen that in order to render the deviation $\Delta$ in the main scanning direction to $\frac{1}{8}$ P or less when the recording density in the auxiliary scanning direction is increased by two times (P is reduced to $\frac{1}{2}$), $\theta \leq 18.8°$ suffices and that in order to render the deviation in the main scanning direction to $\frac{1}{8}$ P or less to increase the recording density in the auxiliary scanning direction by four times, $\theta \leq 15.2°$ suffices.

In the embodiment shown in FIG. 4, when M=10 and A=100 $\mu$m and P=100 $\mu$m, $\theta$=0.1 radian and thus, the angle $\theta$ is very small. When the scanning pitch is one half, namely, P=50 $\mu$M, the angle $\theta$ is further smaller, namely, $\theta$=0.05 radian. Therefore, although the beam interval in the main scanning direction in FIG. 4 is MA cos $\theta$, the interval can be approximated to MA and regarded as invariable because $\theta$ is sufficiently small.

FIGS. 7A and 7B show the beam arrangement when the angle $\theta$ is reduced to one half, namely, $\theta/2$. In this case, the scanning pitch is also reduced to one half and therefore, the width scanned and recorded by the plurality of beams is also reduced to one half. Thus, when the scanning pitch has been reduced to one half, the main scanning speed is increased by two times or the auxiliary scanning speed is reduced to one half. This is necessary to render the scanning of plural beams continuous and is effected in synchronism with the rotation of the image rotator. Where the auxiliary scanning speed is reduced to one half, the main scanning speed is not changed and thus, any variation in the beam interval in the main scanning direction is negligible and therefore, it is not necessary to change the count numbers Na, Nb and Nc corresponding to the beams a, b and c and it is thus possible to effect the data output by the same circuit construction as that previously described.

On the other hand, if in order to obtain the same segment l=Vs/f on the recording medium (where the main scanning speed is doubled), the main scanning speed Vs is doubled, it is necessary to double the frequency f of CLK of FIG. 5. Consequently, it is also necessary to set the count numbers corresponding to the beams a, b and c to 2Na, 2Nb and 2Nc. This must be done in synchronism with the rotation of the image rotator. If said count numbers are set as described above, it is possible to rotate the image rotator by the same circuit construction and, when the scanning pitch is reduced to one half, if the number of revolutions of the scanner is doubled and the count numbers corresponding to the plurality of beams are set to double and the data transferring clock is doubled, then it is also possible to effect the recording of double density.

While the above embodiment has been described with respect to a case where the inclination of the beam is adjusted by rotating the image rotator 60, it is also possible to adjust the inclination of the beam by rotating the light source without using the image rotator.

FIGS. 8-11 show a light source device thus rotatably formed which may be used instead of the semiconductor array laser light source 1 in FIG. 1.

Figure 8:
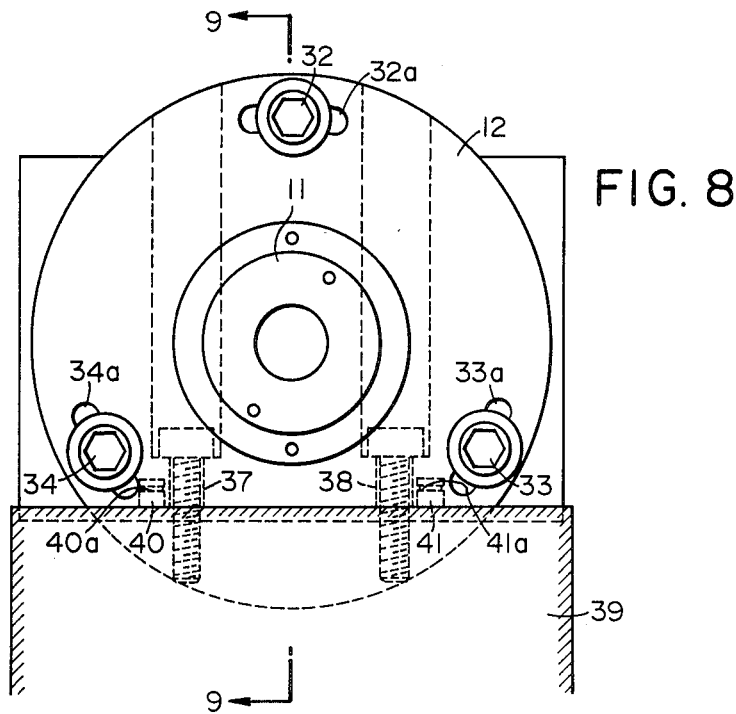
FIGS. 8 to 11, inclusive, illustrate a light source in which beams are rotatable.
Figure 9:
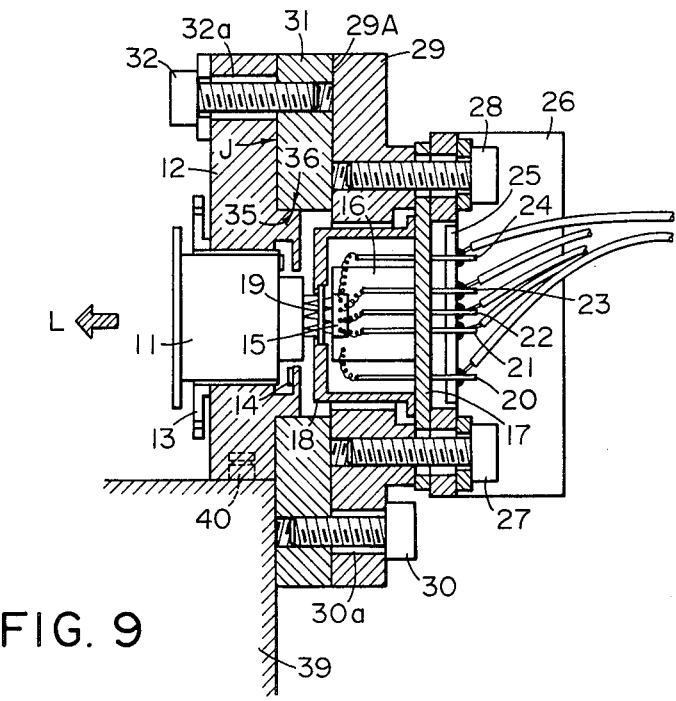

In FIGS. 8 and 9, reference numeral 11 designates a condenser lens mounted on a lens fixing member 12 by means of a thread on the outer periphery thereof and fixed to the fixing member 12 by means of a double nut 13.

Designated by 14 is a spring washer for eliminating any back-lash of the outer peripheral thread of the condenser lens 11.

Denoted by 15 is a semiconductor array laser chip for emitting a plurality of beams La-Lc modulated by a recording signal. The semiconductor array laser chip 15 is bonded onto a mount 16 formed of a heat conductive metal, and the mount 16 is fixed to a base 17 formed of a heat conductive metal. The array laser chip 15 is sealed and shielded from the atmosphere by the base 17 and a cap 18, and the cap 18 has an optical window 19 through which the output light of the array laser may be emitted to the aforementioned condenser lens 11.

Leads 20-24 extending through the base 17 are connected to the electrodes of the array laser 15 and are also connected to an array laser driving circuit, not shown, through a relay plate 25.

Designated by 26 is a heat radiating plate which radiates the heat generated from the array laser. The heat radiating plate 26, with the base 17, is secured to an optical axis adjusting plate 29 by screws 27 and 28.

The optical axis adjusting plate 29 is coupled to an inclination adjusting plate 31 by three screws (in addition to the screw 30, there are two screws 30-1 and 30-2 that are not shown) disposed substantially at an equal interval on a circle centered at the optical axis of the condenser lens 11. A through-aperture 30a corresponding to the screw 30 and two through-apertures 30a-1 and 30a-2 corresponding to the other two screws 30-1 and 30-2 are sufficiently larger than the screws 30, 30-1 and 30-2 and thus, if the screws 30, 30-1 and 30-2 are loosened, the optical axis adjusting plate 29 is slidable with the inclination adjusting plate 31 with a surface 29A as the slide surface. The surface 29A is perpendicular to the optical axis of the condenser lens 11. The inclination adjusting plate 31 is secured to the lens fixing member 12 by screws 32, 33 and 34 disposed substantially at an equal intervals on a circle centered at the optical axis, and in addition, the lens fixing member 12 has a mating portion 35 formed concentrically with the optical axis of the condenser lens 11 and mating with the mating aperture 36 of the inclination adjusting plate 31 and therefore, if the screws 32, 33 and 34 are loosened, the inclination adjusting plate 31 becomes somewhat pivotable within the range of slots 32a, 33a and 34a along the surface J relative to the lens fixing member 12 with the mating portion 36 as the pivot. Of course, as already described, in order that the inclination adjusting plate 31 may be pivotable, the through-apertures 32a, 33a and 34a for screws 32, 33 and 34 formed in the lens fixing member 12 take the form of arcuate slots concentric with the mating portion 35.

The lens fixing member 12 has mounting threaded apertures 37 and 38 for mounting the light source device on the base of the information recording apparatus, and is additionally formed with positioning apertures 40a and 41a for receiving therein positioning pins 40 and 41 projected from the light source mounting portion 39 of the information recording apparatus.

In the light source device constructed as described above, the focus adjustment of the condenser lens 11 may be accomplished by the thread formed on the outer periphery of the condenser lens, and the so-called optical axis adjustment in which the plurality of light-emitting portions of the array laser 15 are adjusted so as to be disposed at symmetrical positions with respect to the optical axis of the condenser lens 11 is also possible and moreover, the above-described focus adjustment and the optical axis adjustment can be effected independently of each other. Therefore, one of said adjustments does not result in derangement of the other adjustment. Further, to incline the arrangement of the scanning beam, the inclination adjusting plate 31 is pivotable coaxially with the optical axis of the condenser lens 11 fixed to the lens fixing member 12. Therefore, the array laser in which the plurality of light-emitting portions are arranged in series can be pivoted and inclined to any angle and the arrangement of the scanning beam can be easily inclined as shown in FIG. 3. Moreover, the pivotal movement of the array laser is coaxial with the optical axis of the condenser lens and the plane of pivotal movement thereof is perpendicular to the optical axis of the condenser lens. Therefore, this pivotal movement does not affect the previously described focus adjustment and optical axis adjustment in any way.

In the aforedescribed embodiment, there are provided the rotating mating portion 35 and mating aperture 36 coaxial with the optical axis of the condenser lens, but if the optical axis of the condenser lens is virtually adjusted as the pivot axis during the assemblage of the light source device, the mating portion 35 and mating aperture 36 may be eliminated without any inconvenience in carrying out the above embodiment.

Figure 10:
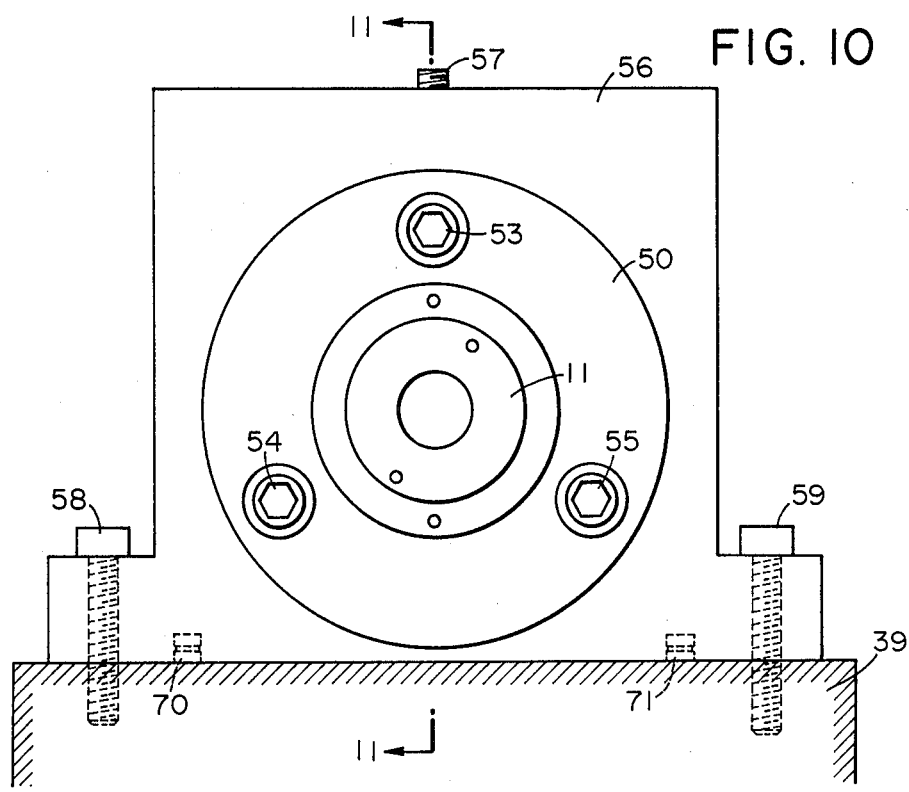
Figure 11:
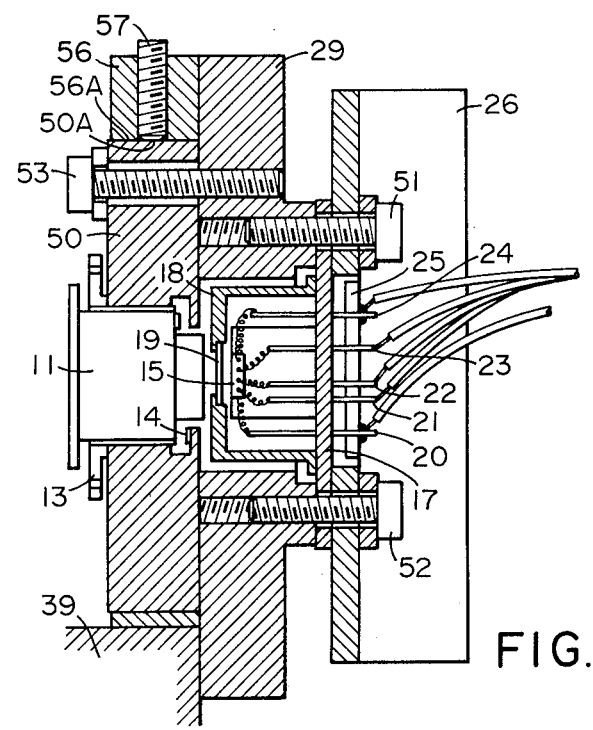

The above-described embodiment is of a construction in which the condenser lens is fixed and the light source is pivotable, whereas another embodiment shown in FIGS. 10 and 11 is of a construction in which the condenser lens and the light source are pivotable together and therefore, according to such embodiment, the possibility of the focus and the optical axis being deranged by pivotal movement is further reduced as compared with the previously described embodiment.

Reference is now had to FIGS. 10 and 11. In the embodiment of FIGS. 10 and 11, the construction of the condenser lens and light source is identical to that in the embodiment shown in FIGS. 8 and 9 and therefore need not be described. Also, in FIGS. 10 and 11, common reference characters are used for elements in common with the embodiment of FIGS. 8 and 9.

The condenser lens 11 is fixed to a disc-like lens mount 50. A light source unit comprising an array laser 15, a cap 18 and a base 17, with a heat radiating plate 26, is fixed to the optical axis adjusting plate 29 by means of screws 51 and 52, and is made integral with the lens mount 50 by screws 53, 54 and 55. (The focus adjustment and optical axis adjustment of the condenser lens 11 and the light source unit is similar to that in FIGS. 8 and 9 and therefore need not be described.)

A light source mount 56 is provided with an aperture 56A mating with the outer periphery 50A of the lens mount 50. The outer periphery 50A is coaxial with the optical axis of the condenser lens 11. Accordingly, the lens mount 50 is pivotable relative to the light source mount 56, and the lens mount 50 fitted to the light source mount 56 is fixed by a set screw 57.

The light source mount 56 is mounted to the light source mounting portion 39 of the information recording apparatus by means of screws 58 and 59. Designated by 70 and 71 are light source device positioning pins provided in the light source mounting portion 39 of the information recording apparatus.

In such construction, the condenser lens 11 and the light source unit are integral and these are pivotable in the mating aperture 56A of the light source mount 56 and therefore, there is no possibility that a deviation between the focuses of the condenser lens 11 and the light source unit and a deviation of the optical axis occur due to the pivotal movement of the light source unit. Therefore the beam arrangement angle can be adjusted very simply.

In the above-described embodiments, the time when the read-out of the image element information from the line buffers LB is started is controlled in accordance with the inclinations of the beams, but as in the other method described previously, the read-out from the respective line buffers may be started simultaneously independently of the inclinations of the respective beams and the image element signals thus read out may be delayed in accordance with the inclinations of the respective beams.

Figure 12:
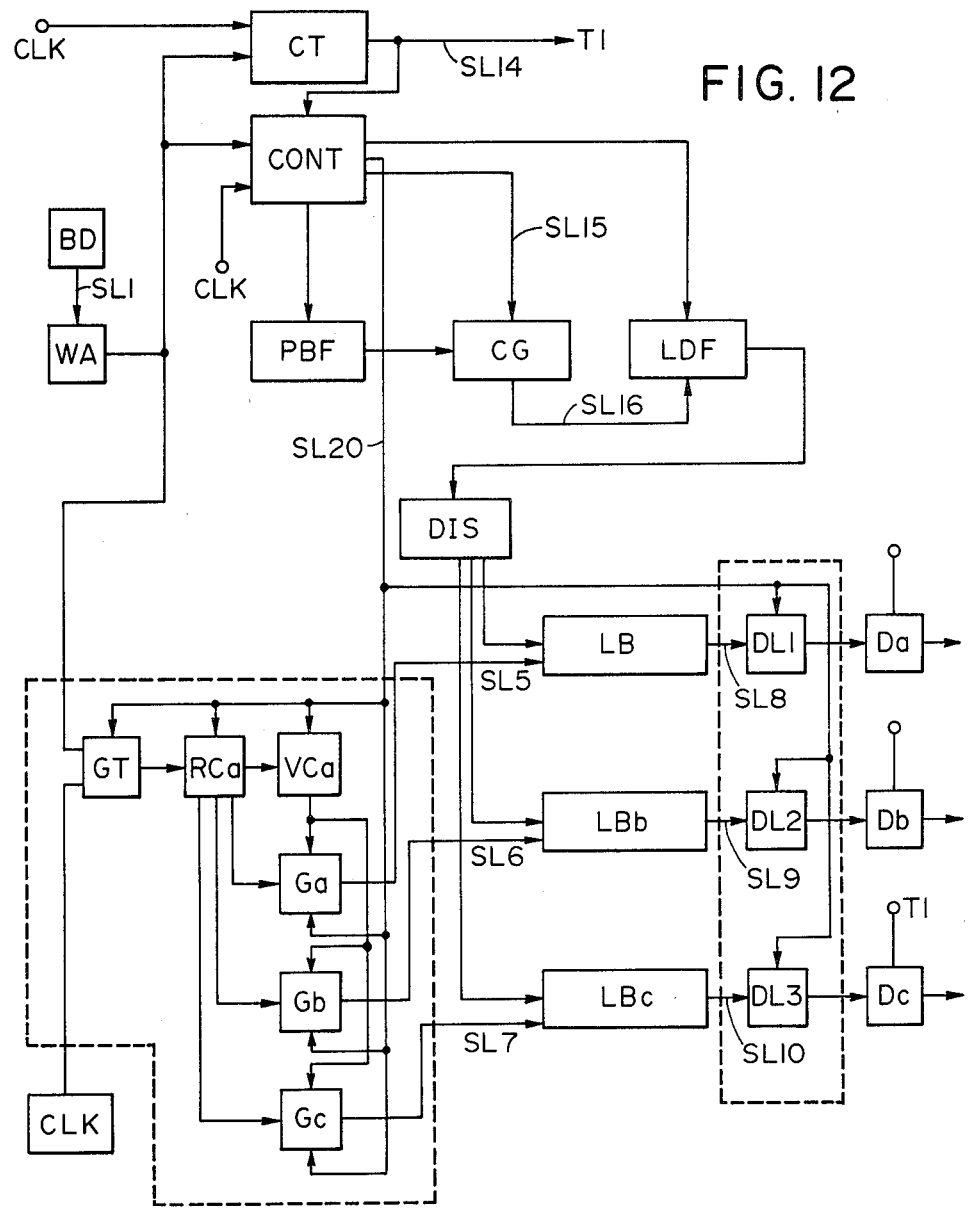
FIG. 12 is a schematic block diagram of the control circuit of the beam recording apparatus according to another embodiment.

Such delayed read-out will be described with reference to FIG. 12. In FIG. 12, circuits given the same reference characters as those in FIG. 5 have similar functions to those in FIG. 5, and the portions encircled by dotted lines differ from FIG. 5.

In FIG. 12, GT designates a gate circuit I, RCa denotes a ring counter circuit, VCa designates a gate control circuit, and Ga, Gb and Gc denote gate circuits. Upon receipt of the output of the waveform shaping circuit WA, the gate circuit GT starts to transmit the output of a reference clock generating circuit CLK to the ring counter RCa.

The ring counter RCa comprises a modulo-N binary counter and transmits to the gate circuits Ga, Gb and Gc an output V having N types of phase and resulting from N-frequency dividing the output of the reference clock generating circuit CLK. The pulse duration of the output V is equal to the pulse duration for one picture element (pel).

The function of the ring counter RCa will now be described in greater detail. Line buffer memories shown at LBa, LBb and LBc effect data output synchronized with clock signals. If LBa, LBb and LBc are driven by a clock signal, the interval MA cos $\theta$ between the adjacent light-emitting points shown in FIG. 4 in the light beam scanning direction is required to have an integer ratio Vs·$\Delta$T, where Vs is the scanning speed and $\Delta$T is the pulse duration of the clock signal. However, if the line buffer memories LBa, LBb and LBc are driven by the clock signal having N types of phase formed by the ring counter RCa, internal MA cos $\theta$ in the light beam scanning direction can be made into (Vs·$\Delta$T)/N, where Vs is the scanning speed and $\Delta$T is the pulse duration of the clock signal having N types of phase. In other words, it is used in order that the irregularity of interval MA cos $\theta$ between the adjacent light-emitting points in the light beam scanning direction may be corrected up to (Vs·$\Delta$T)/N.

Next, the gate circuits Ga, Gb and Gc start to transmit the output from the ring counter RCa to the line buffer circuits LBa, LBb and LBc by the output from the gate control circuit VCa comprising a counter or the like.

The gate control circuit VCa divides in frequency the output of the ring counter RCa by 1/N, whereafter it transmits a gate enabling instruction signal to the gate circuits Ga, Gb and Gc.

Here, the function of the gate control circuit VCa will be described.

The beams La, Lb and Lc shown in FIG. 4 advance lD1 from after the beam Lc has been detected by the beam detector BD until the gate control circuit Ca generates the gate enabling instruction signal. During this period, the clock signal from the ring counter RCa to the line buffer memories LBa, LBb and LBc is inhibited.

That is, by inhibiting the clock signal from the ring counter RCa to be applied to the line buffer memories by the gate control circuit VCa, the amount of delay of delay circuits DL1, DL2 and DL3 to be described can be reduced by an amount corresponding to lD1. This means that the construction of the delay circuits DL1, DL2, and DL3 can be simplified.

By the clock signals from the gate circuits Ga, Gb and Gc being applied through signal lines SL5, SL6 and SL7, dot signals are read out on signal lines SL8, SL9 and SL10 in synchronism with the applied clock signals.

Next, the dot signal read out on the signal line SL8 is applied to the delay circuit indicated at DL1.

Assuming that the dot signal read out on the signal line SL8 forms the La shown in FIG. 4, the dot signal read out on the signal line SL8 is delayed by the delay circuit DL1 for the time $\Delta T_1$ until the beam La comes to the recording start position Ws on the photosensitive drum 5, whereafter it is transmitted to a semiconductor laser modulation circuit Da. How to calculate $\Delta T_1$ will be described later.

Also, assuming that the dot signal read out on the signal line SL9 forms the Lb shown in FIG. 4, the dot signal read out on the signal line SL9 is delayed by the delay circuit DL2 for the time $\Delta T_2$ until the beam Lb comes to the recording start position Ws on the photosensitive drum 5, whereafter it is transmitted to a semiconductor laser modulation circuit Db. How to calculate $\Delta T_2$ will be described later.

Also, assuming that the dot signal read out on the signal line SL10 forms the Lc shown in FIG. 4, the dot signal read out on the signal line SL10 is delayed by the delay circuit DL3 for the time $\Delta T_3$ until the beam Lc comes to the recording start position Ws on the photosensitive drum 5, whereafter it is transmitted to a semiconductor laser modulation circuit DC.

$\Delta T_1$, $\Delta T_2$ and $\Delta T_3$ may be obtained by the following equations:

$$\left[\begin{array}{l} \text{If } la' = la - lD1, \\ \Delta T_1 = la'/Vs \end{array}\right.$$

where la is the distance from after the beam Lc has been detected by the beam detector BD until the beam La reaches the recording start position Ws on the photosensitive drum, lD1 is the distance over which the beams La, Lb and Lc advance from after the beam Lc is detected by the beam detector BD until the gate control circuit VCa generates a gate open signal, Vs is the scanning speed of the beams La, Lb and Lc. Likewise, $$\left[\begin{array}{l} \text{if } lb' = lb - lD1, \\ \Delta T_2 = lb'/VS \end{array}\right.$$

$$\left[\begin{array}{l} \text{if } lc' = lc - lD1, \\ \Delta T_3 = lc'/Vs. \end{array}\right.$$

In the above-described embodiments, the remnant beams are turned off so that only a selected one of the plural beams passes through the beam detector, whereas it is also possible to design the apparatus such that the selected beam passes through the beam detector with the plural beams turned on.

Figure 13:
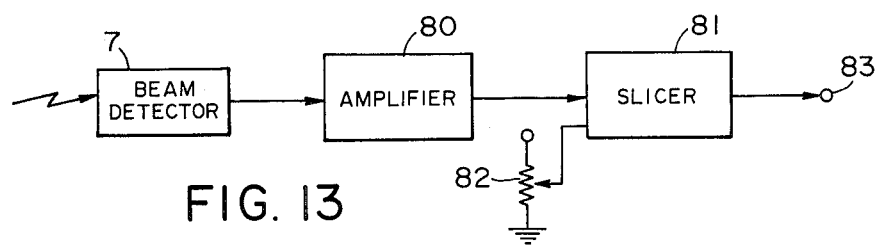
FIG. 13 is a schematic block diagram of a beam detector circuit.
Figure 14:
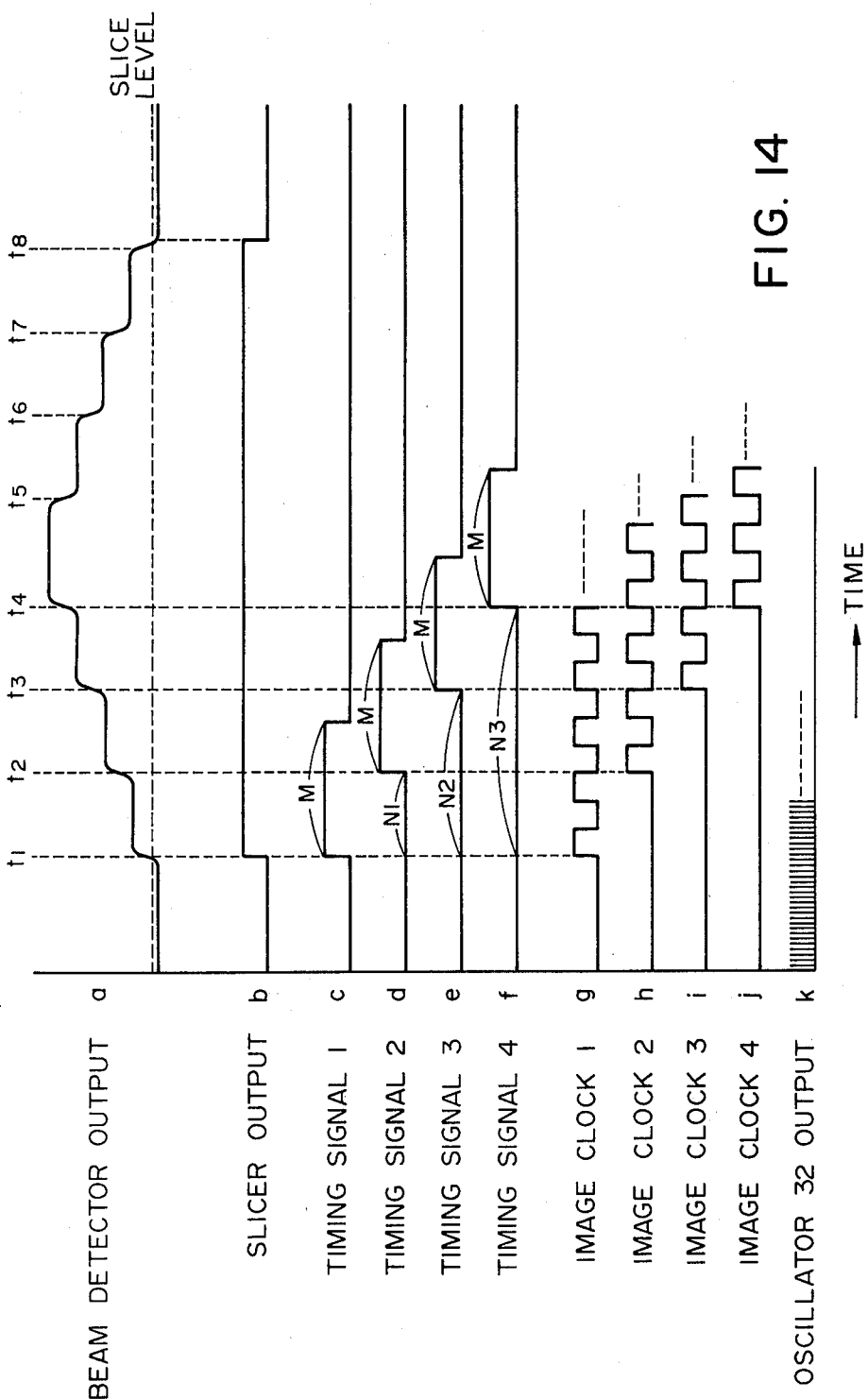
FIG. 14 is a signal waveform illustration useful in understanding the beam detection.
Figure 15:
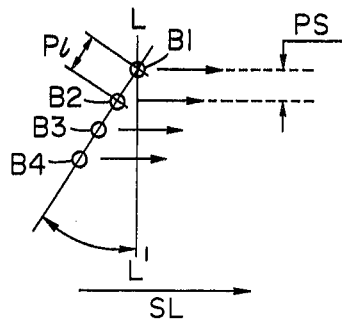
FIG. 15 shows the beam arrangement according to another embodiment.

The output of the beam detector 7 is amplified by an amplifier 80 as shown in FIG. 13, and the output of the amplifier is sliced by a slicer 81. The slice level is determined by a potentiometer 82. This sliced output is developed from a terminal 83. The beam detector 7 encloses therein a light-receiving device and the light-receiving device thereof has such a size as to be capable of receiving all the beams at one time and therefore, the output waveform of the beam detector 7 is integrated into the waveform as shown in FIG. 14a. That is, assuming that the beam projected upon the photosensitive drum 5 comprises four beams as shown in FIG. 15 unlike FIG. 14, $t_1$ shows the time when beam B1 has begun to enter the beam detector 7, $t_2$ shows the time when beam B2 is projected upon the beam detector 7, $t_3$ shows the time when beam B3 is projected upon the beam detector 7, and $t_4$–$t_5$ show the time when all beams B1–B4 are projected upon the beam detector 7.

At $t_5$, beam B1 leaves the beam detector 7; at $t_6$, beam B2 leaves the beam detector 7; at $t_7$, beam B3 leaves the beam detector 7; and at $t_8$, beam B4 leaves the beam detector 7; whereafter no beam is projected upon the beam detector 7 any longer.

In the present embodiment, the timing of the rising of the first beam to be incident on the beam detector 7 is detected to form a detection signal and from this detection signal, a position signal corresponding to each beam is generated as shown in FIGS. 14c–14f.

The details of this portion will be described with reference to FIG. 16.

The slice output (FIG. 14b) of the terminal 83 shown in FIG. 13 is applied to a terminal 90. This is the clear signal of a counter 91 and only in the high section thereof, the counter 91 effects its counting operation. The counter 91 counts the clock signal of a crystal oscillation circuit 92, and the oscillation frequency f1 of this crystal oscillation circuit 92 is higher than the image recording clock f2 (f1=n·f2) of the recording apparatus. It is described by the applicant in U.S. Pat. No. 4,059,833 that as this oscillation frequency becomes higher, the jitter of the image is decreased.

The timing signal 1 shown in FIG. 14c is produced by a flip-flop 93. When the slice output assumes the high level, the output of the flip-flop 93 becomes high. Simultaneously therewith, the counter 91 starts to count the clock from the crystal oscillation circuit 92. The output of the counter 91 is a parallel output of plural bits and that output is applied to comparators (for example, SN 7485 by Texas Instruments Inc.) 95–100.

The comparison inputs of the comparators are preset by a switch group 101 and for example, a numerical value M is applied to the comparator 94, a numerical value N is applied to the comparator 95, and a numerical value N+M is applied to the comparator 96, as shown.

When such preset values are coincident with the output of the counter 91, the comparator outputs assume a high level to invert the flip-flop.

In the case of timing signal 1, when the coincident output of the comparator 94 is produced by the counter 91 counting the numerical value M, the flip-flop 93 is reset and as a result, the output as shown in FIG. 14c is developed.

In the case of timing signal 2, by the counter 91 counting a count value N1, a coincidence output is derived from the comparator 95 to set a flip-flop 102, and by the counter 91 counting N1+M, a coincidence output is derived from the comparator 96 to reset the flip-flop 102 and derive the output as shown in FIG. 14d.

Thereafter, in the same manner, a flip-flop 103 is set by the counter 91 counting N2 and reset by the counter 91 counting N2+M, and a flip-flop 104 is set by the counter 91 counting N3 and reset by the counter 91 counting N3+M.

Timing signals 1–4 are important in their rising time and the durations thereof may be suitable. This rising must be made coincident with the rising portion of the staircase-like signal shown in FIG. 14a. Therefore, with regard to the timing signals 2–4, the signal of FIG. 14a and each timing signal are displayed on an oscilloscope to effect adjustment of the rising portion. This adjustment is carried out by changing over the preset values N1–N3 of the switch group 101.

In FIG. 14, image clocks 1–4 are shown as having a particular phase relation with each other, but of course, depending on the values of the counts N1–N3, the phases of the image clocks 1–4 do not become such as shown.

When the light beam has completely passed over the beam detector 7, the slice output (FIG. 14b) becomes low and the counter 91 is cleared to stop is counting operation. In this embodiment, the timing signals are provided with widths by the use of flip-flops 93, 102, 103 and 104, but if this portion is replaced by a one-shot multivibrator, the reset circuit for the flip-flops may be eliminated and the resetting comparators 94, 96, 98 and 100 may be eliminated.

Figure 17:
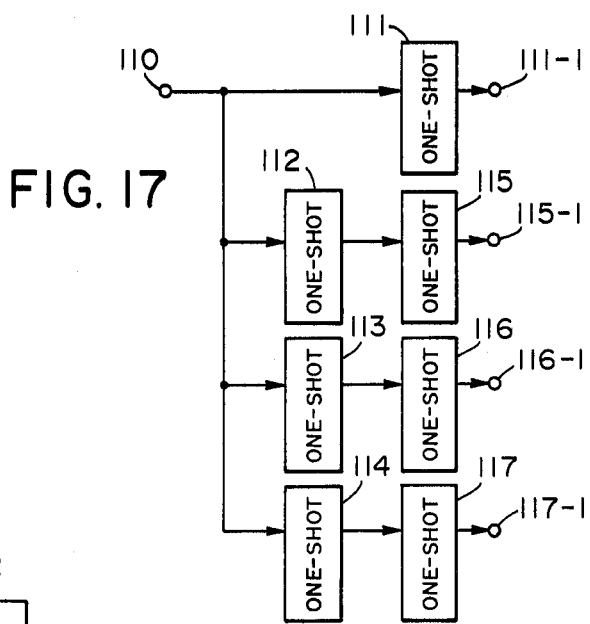

Also, in this embodiment, the delaying of signals is effected by the counter 91, but it is of course possible to use a plurality of one-shot multivibrators to delay the signals and such embodiment is shown in FIG. 17.

A one-shot circuit 111 for generating the timing signal 1 and one-shot circuits 112–114 for delaying the signals are triggered by a slice signal (shown in FIG. 14b) applied from a terminal 110. The output of the one-shot circuit 111 provides the timing signal 1 (FIG. 14c).

The slice signal is delayed by the one-shot circuits 112–114, whereafter it triggers one-shot circuits 115–117 for generating timing signals to make the timing signals as shown in FIGS. 14d, 14e and 14f.

The one-shot circuits for delaying the signals may use delay elements such as ultrasonic wave delay lines.

In the foregoing description, the timing of the first beam to enter the beam detector 7 has been detected, whereas the present invention is not restricted to such embodiment but by increasing the slice level, the timing of the second and third beam to enter the beam detector may be detected and such signals may be delayed to make timing signals 2–4.

Figure 18:
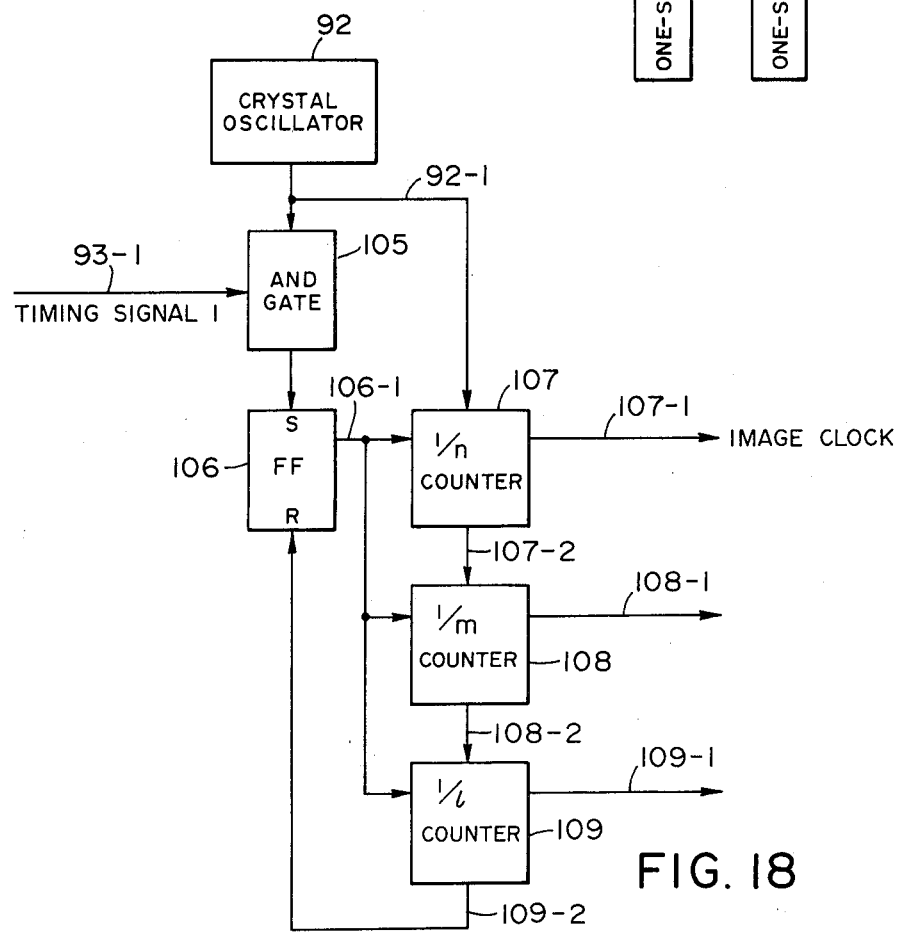
FIG. 18 is a schematic block diagram of a circuit for forming synchronous signals.

FIG. 18 is a circuit block diagram showing the beam position detection and information signal processing in the recording apparatus according to the present invention.

Figure 16:
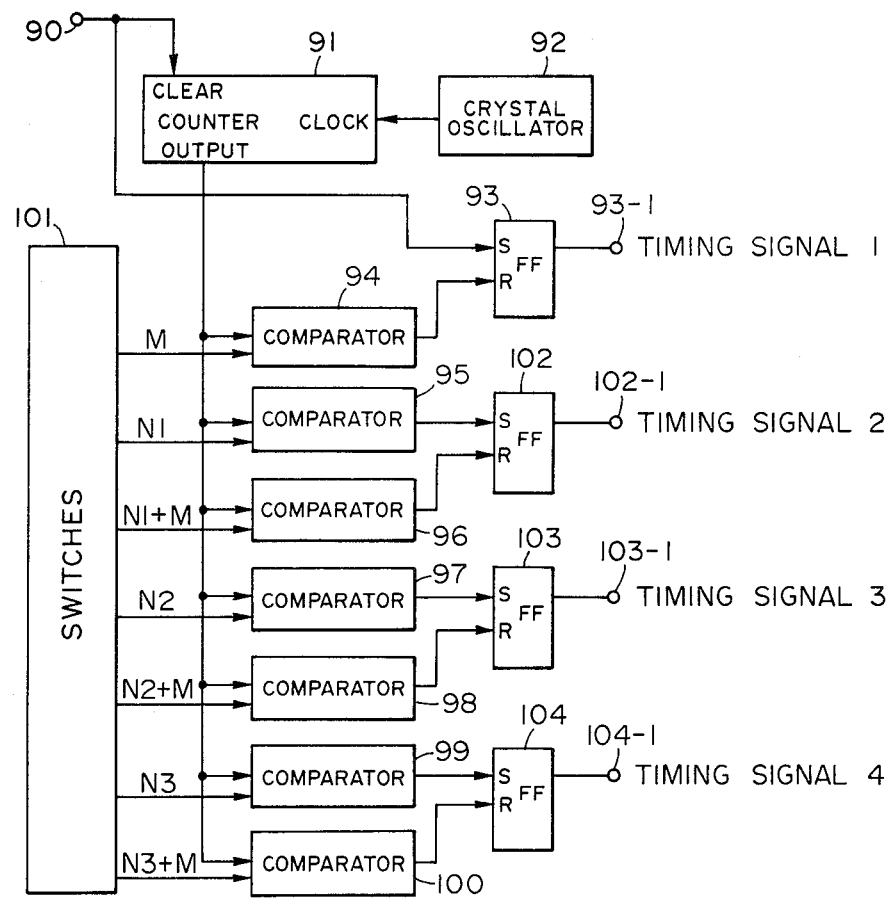
FIGS. 16 and 17 are schematic block diagrams of a timing signal forming circuit.

FIG. 18 shows a load signal generating circuit for receiving the timing signal 1 of FIG. 16 and loading the signal from a character generator onto a shift register. Reference numeral 92 designates a crystal oscillation circuit for generating a frequency n times as great as the image clock shown in FIG. 16, reference numeral 105 designates an AND circuit, reference numeral 93-1 denotes a signal line for introducing the timing signal 1 shown in FIG. 16, reference numeral 106 designates a flip-flop circuit, reference numeral 107 denotes a counter for reducing the frequency of the applied signal to 1/n, reference numeral 108 designates a counter for reducing the frequency of the applied signal to 1/m, and reference numeral 109 denotes a counter for reducing the frequency of the applied signal to 1/l.

The timing signal 1 shown in FIG. 16 is applied to the AND circuit 105, by which it is ANDed with the output of the crystal oscillation circuit 92 to set the flip-flop 106. The output signal 106-1 thereof is applied to the gate input terminal of the 1/n counter 107, which counts the clock of the frequency f1 from the crystal oscillator 92. The output signal thereof is reduced to 1/n by the counter 107 and thus provides an image clock 107-1 of frequency f2. This image clock is then applied to the 1/m counter 108. In this case, m is the same as the number of picture elements produced in parallel when the character generator (110 in FIG. 20) has been accessed, and for example, if eight dots are produced at a time, m=8. Accordingly, the output 108-1 of the counter 108 is a signal developed for m dots each, and is used when the output m bits of the character generator are loaded onto shift registers (111–114 in FIG. 20). Likewise, the signal 108-2 reduced to 1/m is further applied to the 1/l counter 109. The value of l indicates how many dots of m-bit unit are in one line, and for example, if one line is formed by 1600 dots and the output of the character generator is put out at 8-dot unit, l=200. The output of this counter 109 is applied to the reset terminal of the flip-flop 106 to reset this flip-flop, and the gate of the counter 107 is disabled while, at the same, the counters 107, 108 and 109 are cleared. In this manner, load pulses 107-1, 108-1 and 109-1 forming the image signals of one line are made.

Figure 19:
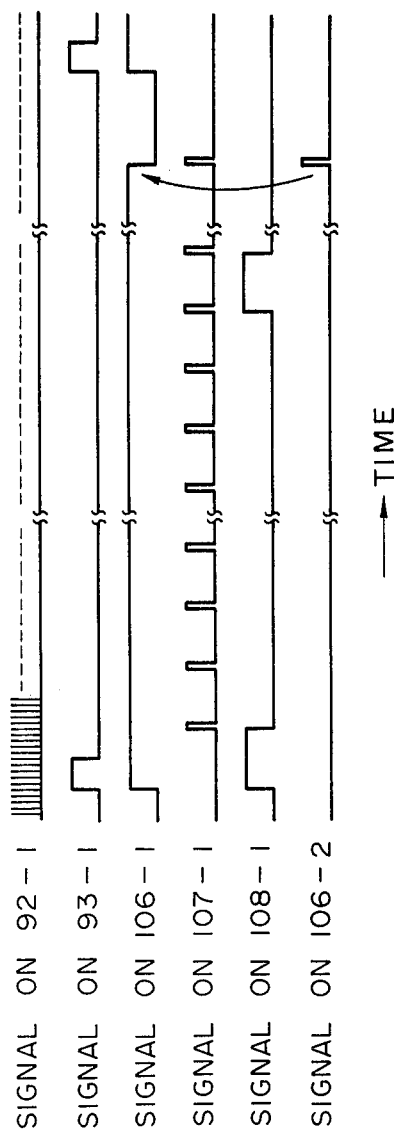
FIG. 19 illustrates the signal waveforms in various portions of the circuit shown in FIG. 18.

FIG. 19 shows the timing of each circuit shown in FIG. 18. In FIG. 19, waveform (a) shows a signal on 92-1 which is a pulse having a frequency n times as great as the image clock, waveform (b) shows a signal on 93-1 which is the timing signal 1 shown in FIG. 16, and waveform (c) shows the output signal 106-1 of the flip-flop 106. Waveform (d) shows the output of the 1/n counter 107 which is the image clock signal, and waveform (e) shows the output signal of the 1/m counter 108 which loads shift register 11 (FIG. 20) with the output (FIG. 20) of the character generator 110 and which is produced for each 1/m of the clock signal shown at (d). Waveform (f) shows the output signal of the 1/l counter 109 which turns off the signal (c), the turn-off of which disables the gates of the counters 107, 108 and 109 and clears these counters.

Figure 20:
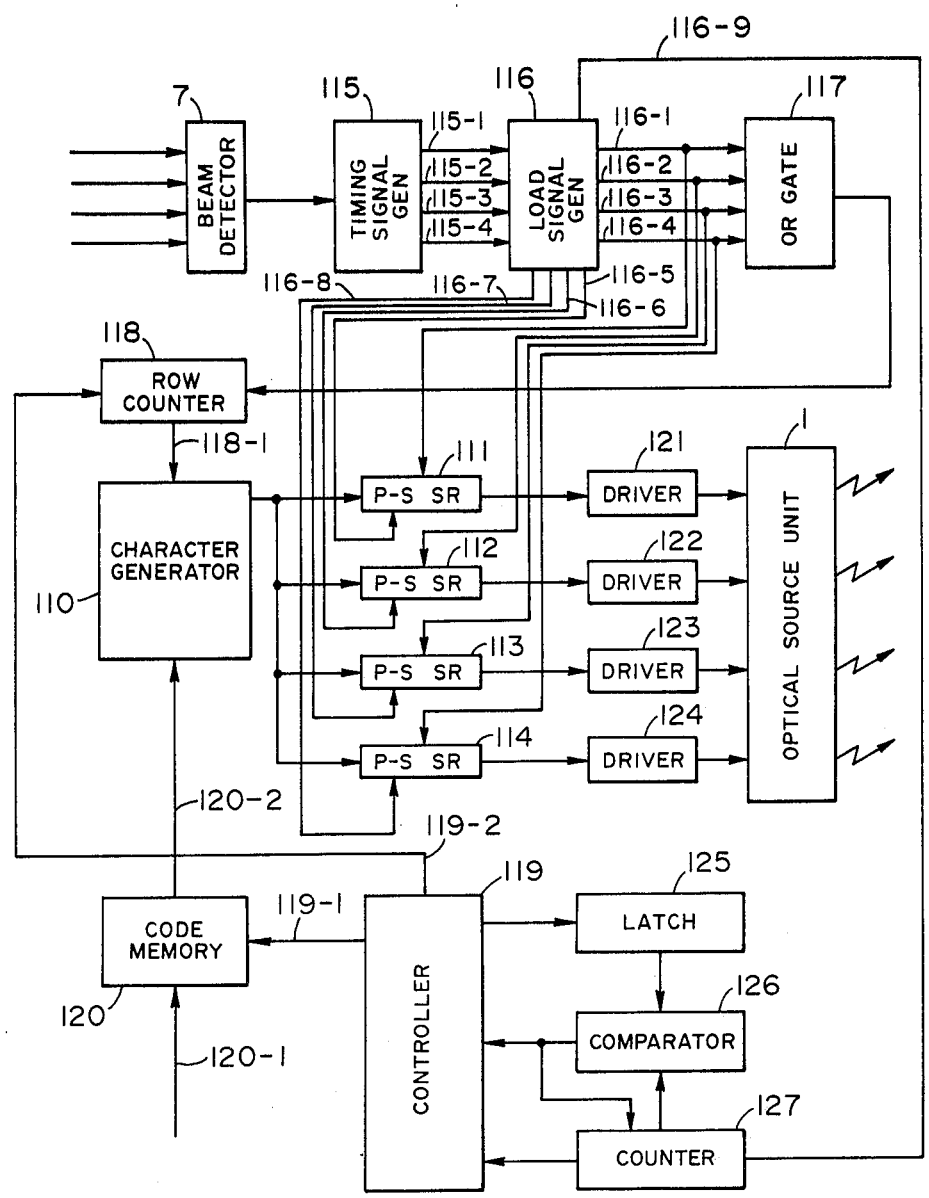
FIGS. 20 and 21 are schematic block diagrams of the control circuit of the beam recording apparatus according to another embodiment.

FIG. 20 is a circuit block diagram showing the beam position detection and information signal processing in the recording apparatus.

Reference numeral 7 designates the beam detector, reference numeral 115 designates the timing signal generator shown in FIG. 16, and reference numerals 115-1 to 115-4 denote signal lens for outputting timing signals 1-4. Reference numeral 116 designates a combination of four load signal generating circuits shown in FIG. 18, and 116-1 to 116-4 respectively correspond to the signal lines 115-1 to 115-4. Reference numeral 117 denotes an OR circuit of 116-1 to 116-4, reference numeral 118 designates a row address counter, reference numeral 119 denotes a controller as used, for example, in the aforementioned U.S. Pat. No. 4,059,833, reference numeral 120 designates a code memory, reference numeral 120-1 denotes a code signal put out from an extraneous instrument, reference numeral 120-2 designates the output signal from the memory 120, reference numeral 110 designates a character generator, reference numerals 111–114 denote parallel-to-serial conversion shift registers, reference numerals 121–124 designate laser drivers, and reference numeral 1 denotes an optical source unit such as an array laser in which a plurality of semiconductor lasers shown in FIG. 1 are arranged in a row. Reference numeral 125 designates a latch, reference numeral 126 denotes a comparator, and reference numeral 127 designates a counter. The controller 119 causes the code signal 120-1 from an extraneous instrument (not shown) to be stored in the memory 120 and, when a desired data amount is reached, converts it into one line of code row and successively accesses the character generator 110. The character generator 110 is a conventional one and has stored therein a dot matrix-like pattern corresponding to the code signal and when the code signal and row signal (scanning line signal) are imparted thereto, a particular dot signal is produced as m dots in parallel. The output signal 120-2 from the memory 120 is a code signal, and the output signal 118-1 of the row counter 118 becomes a row signal. On the other hand, the output signal of the beam detector 7 is applied to the timing signal generator 115, which thus generates timing signals 115-1 to 115-4 as shown in FIG. 16, and these signals are applied to the load signal generator 116. Thus, as shown in FIG. 18, there are generated image clock signals 116-5 to 116-8 (116-6 to 116-8 correspond to the timing signals 2-4) and load signals 116-1 to 116-4 (116-2 to 116-4 correspond to the timing signals 2-4), and these are applied to the parallel-to-serial conversion shift registers 114—114. On the other hand, the load signals 116-1 to 116-4 are applied to the OR circuit 117, and then applied to the row counter 118. The row counter 118 has its count renewed by the load signals 116-1 to 116-4, and each time the count is renewed, the output signal of the character generator 110 is loaded into the parallel-serial conversion shift registers 111–114. Each time the code signal 120-2 is renewed by the controller 119, the counter 118 is preset to its initial condition by the signal 119-2. Described in greater detail, the load signals 116-1 to 116-4 from the load signal generator 116 are delayed in phase by N1, N2 and N3, respectively, as shown in FIG. 14. Accordingly, when the OR signal of the signals 116-1 to 116-4 updates the row counter 118 and accesses the character generator 110, the output signal thereof is loaded into the shift register 111 by the load signal 116-1, is loaded into the shift register 112 by the signal 116-2, is loaded into the shift register 113 by the signal 116-3, and is loaded into the shift register 114 by the signal 116-4. On the other hand, signals 116-5 to 116-8 are image clock signals and convert into serial signals the signals loaded into the shift registers 111–114. On the other hand, the controller 119 causes the number of line dots of the dot matrix pattern of the character generator 110 to be latched in the latch 125. A one-line termination signal 116-9 produced from the load signal generator 116 effects the addition +4 on the counter 127. In FIG. 20, four array lasers are taken as an example, but in case of M array lasers, the addition +M is effected on the counter 127. Comparator 126 compares the number of line dots of the dot matrix pattern of the latch 125 with the line counter 127 being actually renewed and, when the two become equal, it clears the counter 127 while, at the same time, it produces a signal to the controller 119. This terminates a character or a pattern comprising a code signal. Each time the code signals in one line are renewed (120-2), the controller 119 senses the value of the counter 127 and sets the row counter 118 through signal line 119-2. Thus, the row counter 118 which accesses the character generator 110 has its counter value set each time the code is renewed and therefore, the characters or patterns in one line are properly arranged and put out.

Next, the signals of the shift registers 111–114 are applied to laser drivers 121–124, respectively, to drive the laser array 1. By this beam, information is recorded on the photosensitive drum shown in FIG. 1.

Thus, according to the present embodiment, even if a plurality of recording beams are arranged non-perpendicularly to the scanning direction, image signals out of phase with each other are produced by combining the beam detection signal and a pulse having a frequency n times as great as that of the image clock, whereby 1. The dot deviation can be kept down to 1/n of one dot; and
2. The character generator (which has stored therein the dot matrix-like pattern for generating a character or a pattern) is directly accessed and therefore, image signals can be produced by a simple construction.

The above embodiment has been described with respect to a case where the recording of information is effected by using all of plural beams, but alternatively, it is possible to vary the scanning line density by using all or some of the plural beams.

Figure 21:
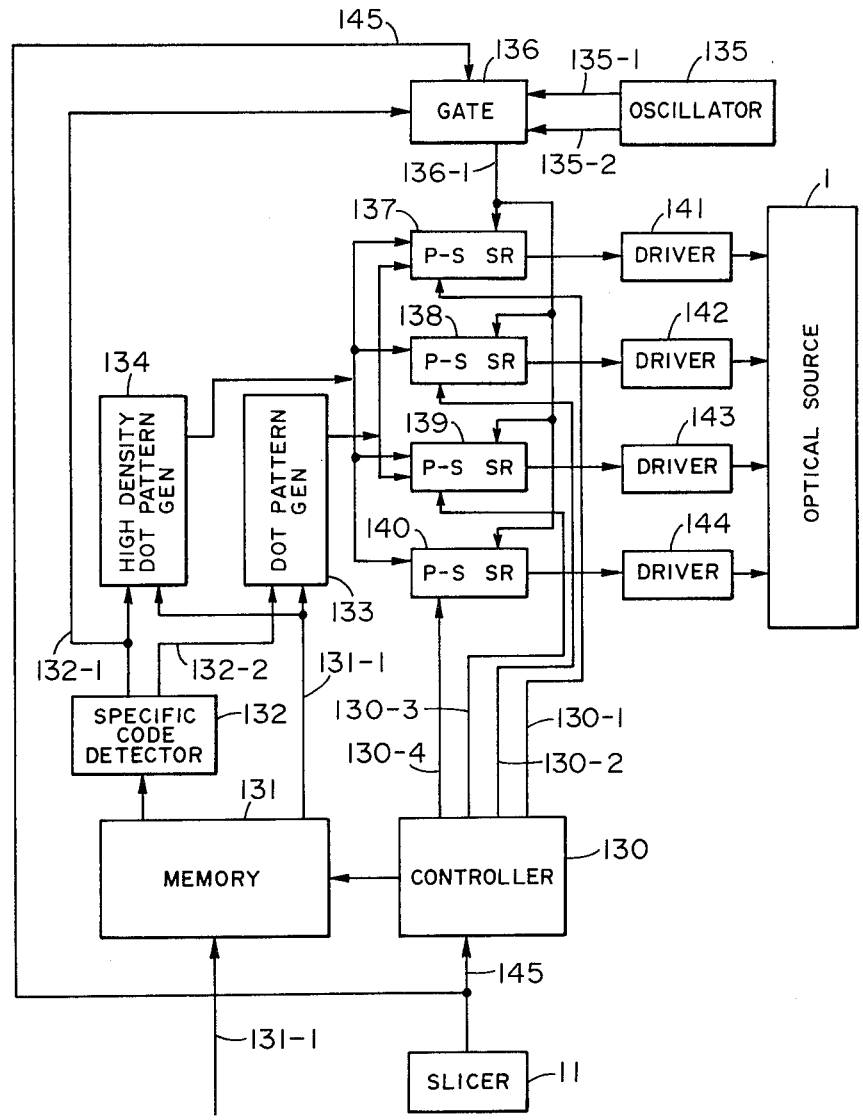

In FIG. 21, reference numeral 130 designates a controller which may be the one used, for example, in U.S. Pat. No. 4,059,833, reference numeral 131 denotes a memory for storing code signals, reference numeral 132 designates a specific code detector, reference numeral 133 denotes a dot pattern generator having stored therein a dot pattern formed of normal dot density, reference numeral 134 designates a dot pattern generator having stored therein a dot pattern formed of column and row densities twice as high as the density of the generator 133, reference numeral 135 denotes an oscillator circuit generating clock signals of frequencies f1 and 2 f1, reference numeral 136 designates a gate circuit, reference numerals 137–140 denote parallel-to-serial conversion shift registers, reference numerals 141–144 designate circuits for driving the beam generator, reference numeral 1 denotes a semiconductor array laser optical source for generating plural (four) beams, and reference numeral 11 designates the slicer shown in FIG. 13. The controller 130 causes the code signal 131-1 from an extraneous instrument (not shown) to be stored in the memory 131. When a predetermined amount is reached, the dot pattern generator is accessed to start the recording of information. First, the first code signal in one line is applied to the dot pattern generators 133 and 134. If, following this code signal, a control code instructing to record at high density is being generated, the control code is applied to the specific code detector 132. When a specific code is detected, signal 132-1 is produced to render the high density dot pattern generator 134 operable. On the other hand, signal 132-2 is not produced but renders the normal density dot pattern generator 133 inoperable. Also, the detection signal 132-1 is applied to the gate circuit 136 and from among the image clocks provided from the oscillator circuit 135, the clock 135-2 having a high frequency is selected and synchronized with the beam position detection signal 145 and is applied to the parallel-to-serial conversion registers 137–140. On the other hand, the controller 130 supplies code signal 131-1 to the dot pattern generators 133 and 134 and simultaneously therewith, taking the timing with the beam position detection signal 145 (substantially in synchronism with the period when the respective beams have passed through the beam detector), successively delivers the signals 130-1 to 130-4 for loading the signal from the dot pattern generator 134 into the parallel-to-serial conversion registers 137–140. The signal loaded into the registers 137–140 is made into a serial image dot signal by the selected image clock signal 136-1 and is applied to the beam driving circuits 141-144 to drive the optical source 1, thereby recording information on the drum 5.

On the other hand, when the specific signal is not detected by the specific signal detector 132, the detection signal 132-1 is not developed but a non-detection signal 132-2 is produced to render the normal density dot pattern generator 133 operable. Since the detection signal 132-1 is not generated, the gate circuit 136 selects an image clock of lower frequency and applies it to the registers 137-140 while taking the timing with the beam position detection signal 145. The output signal of the normal density dot pattern generator 133 is applied to the parallel-to-serial conversion registers 137 and 139. The controller 130 causes load pulses 130-1 and 130-3 to be applied to the parallel-to-serial conversion registers 137 and 139 while taking the timing with the beam position detection signal 145. There, these pulses are rendered into serial image dot signals which are applied to plural beam generator driving circuits 141 and 143 to operate plural beam generators. In the drive circuits 142 and 144, there are not the image signals from the parallel-to-serial conversion registers 138 and 140, so that no beam is generated and the beam density, namely, the scanning density, becomes a normal mode.

Thus, according to the present embodiment, the specific signal is detected and one of plural beams which is to be driven is selected and the image clock frequency is varied, whereby a high density pattern can be readily recorded at any location of one page information. While normal density 133 and high density 134 have been used as the dot pattern generators, it is also possible to use only normal density 133 to record the same dot twice.

Herein, the case of four beams has been taken as an example of plural beams, but the number of beams may be two or more. Also, if the number of beams is n and $nPS_2$=normal image element interval and one beam is driven during the normal mode and n beams are all driven during the high density mode and the image clock frequency is increased by n times, then a pattern of image element density n times as great as that during the normal mode can be obtained. While the scanning line density and the density in the scanning direction have been changed at a time, only one of them which is effective as the high density image may be changed. High density recording can be accomplished without causing any time delay at any location of one page data, and the quality of printing can be enhanced.

What I claim is:

1. Beam recording apparatus for recording with a plurality of beams, said apparatus comprising:
   beam generating means for generating a plurality of beams modulated with recording signals;
   beam deflecting means for deflecting the beams generated by said beam generating means;
   beam irradiated means irradiated with the plurality of beams deflected by said beam deflecting means; and
   optical means for directing the beams generated by said beam generating means to said beam irradiated means; and
   rotating means for rotating said optical means and said beam generating means as a single unit to vary the inclination of the beams with respect to said beam irradiated means.

2. Beam recording apparatus for recording with a plurality of beams, said apparatus comprising:
   beam generating means for generating a plurality of beams;
   beam deflecting means for deflecting the plurality of beams generated by said beam generating means;
   beam detector means provided in the region to which the beams are deflected by said beam deflecting means;
   means for selecting and controlling said beam generating means so that only a selected one of said plurality of beams passes through said beam detector means;
   means for detecting said selected beam by said beam detector means to form a detecting signal;
   means for forming a plurality of synchronous signals respectively corresponding to said plurality of beams with each signal occurring at a time different from each other signal by utilizing said detecting signal; and
   means for controlling a reading-out of recording signals from a memory storing said recording signals in accordance with said plurality of synchronous signals to control the start of modulation of said beams.

3. Beam recording apparatus according to claim 2, wherein said synchronous signal forming means has a delay circuit for forming synchronous signals.

4. Beam recording apparatus according to claim 2, wherein said selection control means has counter means adapted to be cleared in response to the detection of the beams by said beam detector means.

5. Recording apparatus for recording with a plurality of beams, said apparatus comprising:
   a recording medium for recording information thereon;
   beam forming means for generating a plurality of beams so that the beams are projected at an incline with respect to a scanning direction onto said recording medium;
   deflecting means for deflecting said plurality of beams so as to scan said recording medium in the scanning direction with said plurality of beams;
   control means for controlling said beam forming means to modulate said beams with recording signals; and
   selecting means for selecting a high density recording mode in which all of the beams are modulated with the recording signal, or a low density recording mode in which some of the beams are modulated with the recording signal.

6. Recording apparatus for recording with a plurality of beams, said apparatus comprising:
   beam forming means for forming a plurality of beams modulated with a modulation signal;
   a recording medium irradiated with the plurality of beams generated by said beam forming means;
   beam deflecting means for deflecting said beams so that the angle formed on said recording medium by the arrangement direction of said plurality of beams with the scanning direction of said plurality of beams is not a right angle;
   beam detector means disposed in the region to which the beams are deflected by said beam deflecting means to detect the arrival of the beams;
   synchronous signal forming means for forming a plurality of synchronous signals corresponding to said plurality of beams upon detection of the beams by said beam detector means;

a plurality of converter means corresponding in number to said plurality of beams and for converting clock signals of a first frequency into clock signals of a second frequency lower than said first frequency;

means for driving said plurality of converter means by said plurality of synchronous signals, respectively;

a plurality of memories having stored therein a plurality of recording signals for modulating said beams;

read-out means for applying to said plurality of memories said clock signals of the second frequency formed by driving of said driving means and for reading out the plurality of recording signals; and means for applying said plurality of recording signals to said beam forming means to modulate said beams with the recording signals read out by said read-out means as the modulation signals.

* * * * *